United States Patent [19]
Min

[11] Patent Number: 5,726,958
[45] Date of Patent: Mar. 10, 1998

[54] SPINDLE MOTOR GAIN CONTROL METHOD FOR CD-ROM DRIVES AND APPARATUS THEREFOR

[75] Inventor: Kyoung-seo Min, Suwon, Rep. of Korea

[73] Assignee: SamSung Electronics Co., Ltd., Suwon, Rep. of Korea

[21] Appl. No.: 628,336

[22] Filed: Apr. 5, 1996

[30] Foreign Application Priority Data

May 12, 1995 [KR] Rep. of Korea ............... 95-11764

[51] Int. Cl.$^6$ ............................................. G11B 17/22
[52] U.S. Cl. ..................................... 369/32; 369/50
[58] Field of Search ............................. 369/32, 47, 48, 369/50, 54, 58, 44.28, 30, 33; 360/78.04, 78.06, 78.07, 78.14

[56] References Cited

U.S. PATENT DOCUMENTS

| | | | |
|---|---|---|---|
| 4,641,294 | 2/1987 | Yoshimaru | 369/50 X |
| 4,896,311 | 1/1990 | Ishihara | 369/50 X |
| 5,050,145 | 9/1991 | Yoshida . | |
| 5,056,076 | 10/1991 | Tsuji et al. . | |
| 5,063,552 | 11/1991 | Shigemori | 369/50 |
| 5,153,869 | 10/1992 | Yoshimaru et al. | 369/50 X |
| 5,216,647 | 6/1993 | Kitani | 369/50 X |
| 5,373,495 | 12/1994 | Takada . | |
| 5,420,841 | 5/1995 | Hwang | 369/50 |
| 5,444,687 | 8/1995 | Okumura | 369/50 |
| 5,528,573 | 6/1996 | Shim | 369/50 |
| 5,561,644 | 10/1996 | Kondo | 369/50 X |

*Primary Examiner*—Paul W. Huber
*Attorney, Agent, or Firm*—Robert E. Bushnell, Esq.

[57] ABSTRACT

A method for controlling the gain of a spindle motor in a CD-ROM drive, includes the steps of: calculating a first number of tracks on a disc from a starting point of a program region to a reproduction position of data to be reproduced according to information received from a main controller; calculating a first rotational speed of the spindle motor corresponding to the reproduction position; reading a predetermined code to obtain information representative of a current position of a pickup; calculating a second number of tracks on the disc from the starting point of the program region to the current position of the pickup; calculating a second rotational speed of the spindle motor corresponding to the current position of the pickup; and driving a sled motor to move the pickup to the reproduction position and controlling the spindle motor based on a first quantity defining a difference between the first number of tracks and the second number of tracks, and further based on a second quantity defining a difference between the first rotational speed and the second rotational speed.

19 Claims, 3 Drawing Sheets

SPINDLE MOTOR GAIN CONTROL METHOD FOR CD-ROM DRIVES AND APPARATUS THEREFOR

CROSS-REFERENCE TO RELATED APPLICATIONS

This application makes reference to, incorporates the same herein, and claims all benefits accruing under 35 U.S.C. §119 arising from an application for *Spindle Motor Gain Control Method For CD-ROM Drives And Apparatus Therefor* earlier filed in the Korean Industrial Property Office on 12 May 1995 and there duly assigned Serial No. 11764/1995.

BACKGROUND OF THE INVENTION

The present invention relates to a method of controlling the gain of a spindle motor in a compact disc read-only memory (CD-ROM) drive and an apparatus therefor, and more particularly, to a method of controlling the gain of a spindle motor in a CD-ROM drive and an apparatus therefor capable of reducing the time for converting the rotational speed of the spindle motor and enhancing the performance of the CD-ROM drive.

A CD-ROM drive is a peripheral unit of a computer, and operates upon a compact disc which provides a large amount of data storage capacity. A compact disc player (CDP) is a system similar to the CD-ROM drive. The CDP is an apparatus for reproducing audio data recorded on a compact disc. On a compact disc for the CDP, audio data is recorded with a constant linear velocity of about 1.2 m/see to 1.4 m/sec.

Since the idea of the CD-ROM drive is derived from the CDP, most CD-ROM drives can reproduce data from compact discs constructed for the CDP. Conventional disc playback devices are shown, for example, in U.S. Pat. Nos. 5,050,145 and 5,373,495. In order to provide high speed data access in the latest CD-ROM drives, the spindle motor is rotated at two, three or four times the normal rotational speed of a disc in the conventional CDP, so as to quickly read data on the disc and then transmit the read data to a host computer. In CD-ROM drives that operate according to double, triple or quad speeds however, the rotational speed of the spindle motor must be converted into normal speed in order to properly reproduce audio data from the disc. In cases where only computer data is recorded on the disc, the spindle motor is rotated at X speed (i.e., double speed or higher), and then the CD-ROM drive can access the data. That is, an operation for searching for the data, and an operation for reading the data can both be performed when the spindle motor is set to rotate at X speed. In cases where both audio data and computer data are recorded on the disc however, a conversion between normal speed and X speed must occur. In either case, when the disc is rotated at X speed when searching for data on the disc and the data is read while the disc rotates at X speed, delay time is reduced and the data can be quickly searched and read. Accordingly, performance of the CD-ROM drive can be enhanced.

According to conventional methods, however, when computer data is accessed while audio data is reproduced, the rotational speed of the spindle motor is converted to X speed, and then the computer data is accessed. On the other hand, when computer data is reproduced while audio data is accessed, the rotational speed of the spindle motor is converted to normal speed, and then the reproduction position of audio data to be reproduced is accessed, or the reproduction position of audio data to be reproduced is accessed, and then the rotational speed of the spindle motor is converted to normal speed. In either case, however, the conventional method consumes an unnecessary amount of time since a single step is exclusively devoted for converting the rotational speed of the spindle motor. Accordingly, performance of the CD-ROM drive is lowered.

SUMMARY OF THE INVENTION

Accordingly, it is an object of the present invention to provide an improved spindle motor gain control method for CD-ROM drives, and an apparatus therefor.

It is another object to provide a spindle motor gain control method for CD-ROM drives, and an apparatus therefor, which can sharply reduce the amount of time required in converting the rotational speed of a spindle motor when computer data is accessed while audio data is reproduced, or when audio data is accessed while computer data is reproduced.

To achieve these and other objects, the present invention provides a method for controlling the gain of a spindle motor in a CD-ROM drive with the steps of calculating a first number of tracks on a disc from a starting point of a program region to a reproduction position of data to be reproduced according to information received from a main controller; calculating a first rotational speed of the spindle motor corresponding to the reproduction position; reading a predetermined code to obtain information representative of a current position of a pickup; calculating a second number of tracks on the disc from the starting point of the program region to the current position of the pickup; calculating a second rotational speed of the spindle motor corresponding to the current position of the pickup; and driving a sled motor to move the pickup to the reproduction position and controlling the spindle motor based on a first quantity defining a difference between the first number of tracks and the second number of tracks, and further based on a second quantity defining a difference between the first rotational speed and the second rotational speed.

The present invention further provides an apparatus for controlling the gain of a spindle motor in a CD-ROM drive, constructed with a main controller for controlling an overall operation of the apparatus; a spindle motor gain controller for controlling a gain of the spindle motor according to spindle motor gain control signals received from the main controller, with the spindle motor gain control signals indicating a conversion of rotational speed of the spindle motor and a change of reproduction position on a disc; a spindle motor driver for receiving the spindle motor gain signals, and generating spindle motor driving signals to drive the spindle motor; and a spindle motor controller for receiving error signals generated from the spindle motor, and comparing the error signals with a reference rotational speed of the spindle motor to generate spindle motor control signals for output to the spindle motor gain controller.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
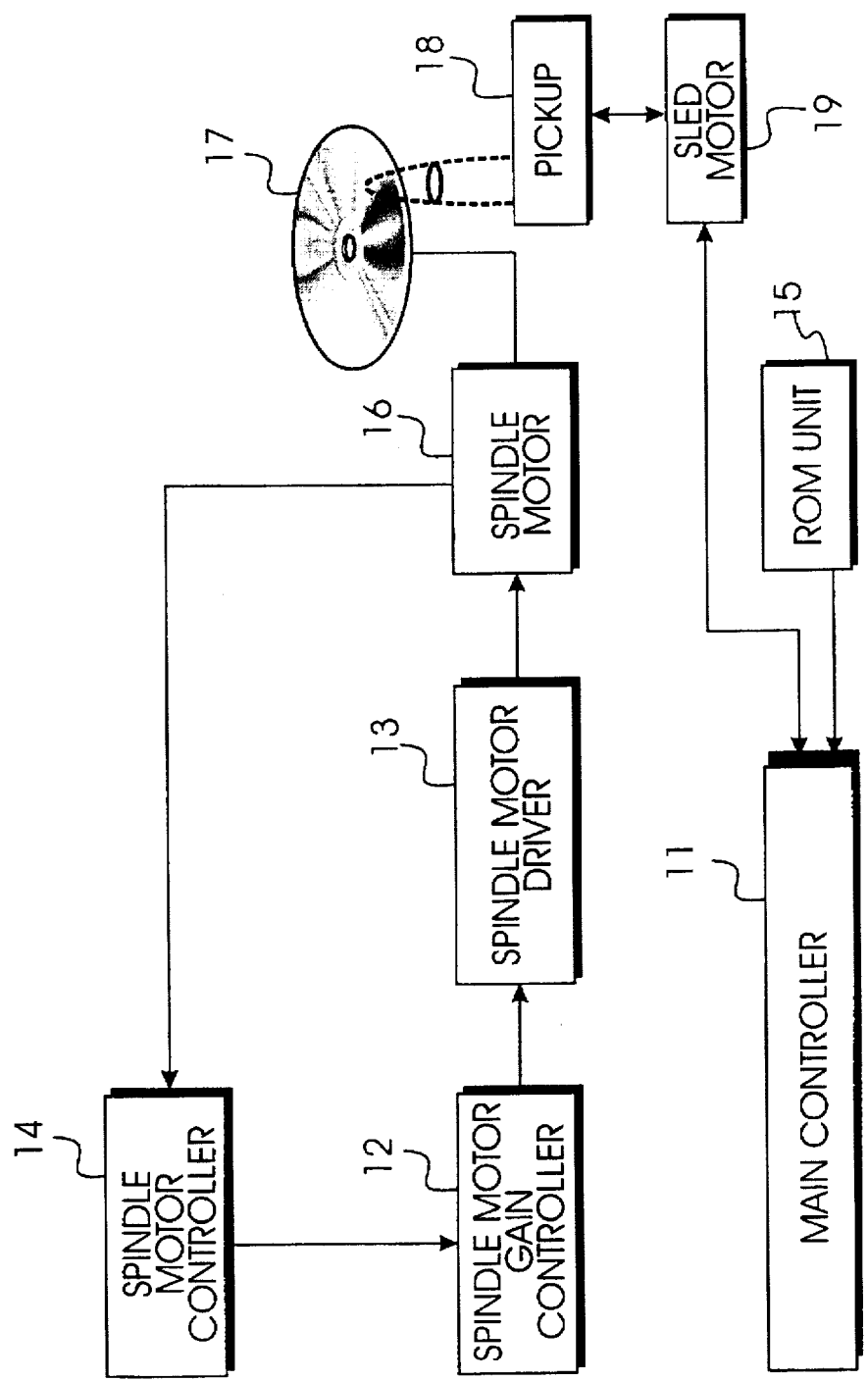
FIG. 1 is a block diagram showing a spindle motor gain control apparatus in a CD-ROM drive constructed according to the principles of the present invention.

Turning now to the drawings and referring to FIG. 1, a spindle motor gain control apparatus in a CD-ROM drive constructed according to the principles of the present invention is shown. The spindle motor gain control apparatus of FIG. 1 includes a main controller 11 having a microprocessor for controlling the overall operation of the apparatus. A spindle motor gain controller 12 receives spindle motor gain control signals from main controller 11, and accordingly controls spindle motor gain. The spindle motor gain control signals indicate a conversion of the rotational speed of a spindle motor 16 from a normal speed (i.e., 1×speed) to a multiple speed (i.e., 2×speed or higher), a conversion of the rotational speed of spindle motor 16 from multiple speed to normal speed, and a change of reproduction position. A spindle motor driver 13 receives spindle motor gain signals from spindle motor gain controller 12 obtained by controlling the spindle motor gain, and generates spindle motor driving signals. A spindle motor controller 14 receives error signals generated from spindle motor 16, and compares the error signals with a reference rotational speed to generate spindle motor control signals for output to the spindle motor gain controller 12. A read-only memory (ROM) unit 15 stores a table providing audio data position information corresponding to the number of tracks in a program region of a disc 17 to enable determination of a spindle motor gain control time by main controller 11, a table providing rotational speeds of spindle motor 16, and a table providing control times based on differences in the rotational speeds. An optical pickup 18 is moved along a surface of disc 17 by a sled motor 19. In FIG. 1, ROM unit 15 is shown as being a wholly separate component. It is intuitive, however, that ROM unit 15 can be placed within main controller 11 so that the data recorded in ROM unit 15 is stored directly in main controller 11.

Figure 2:
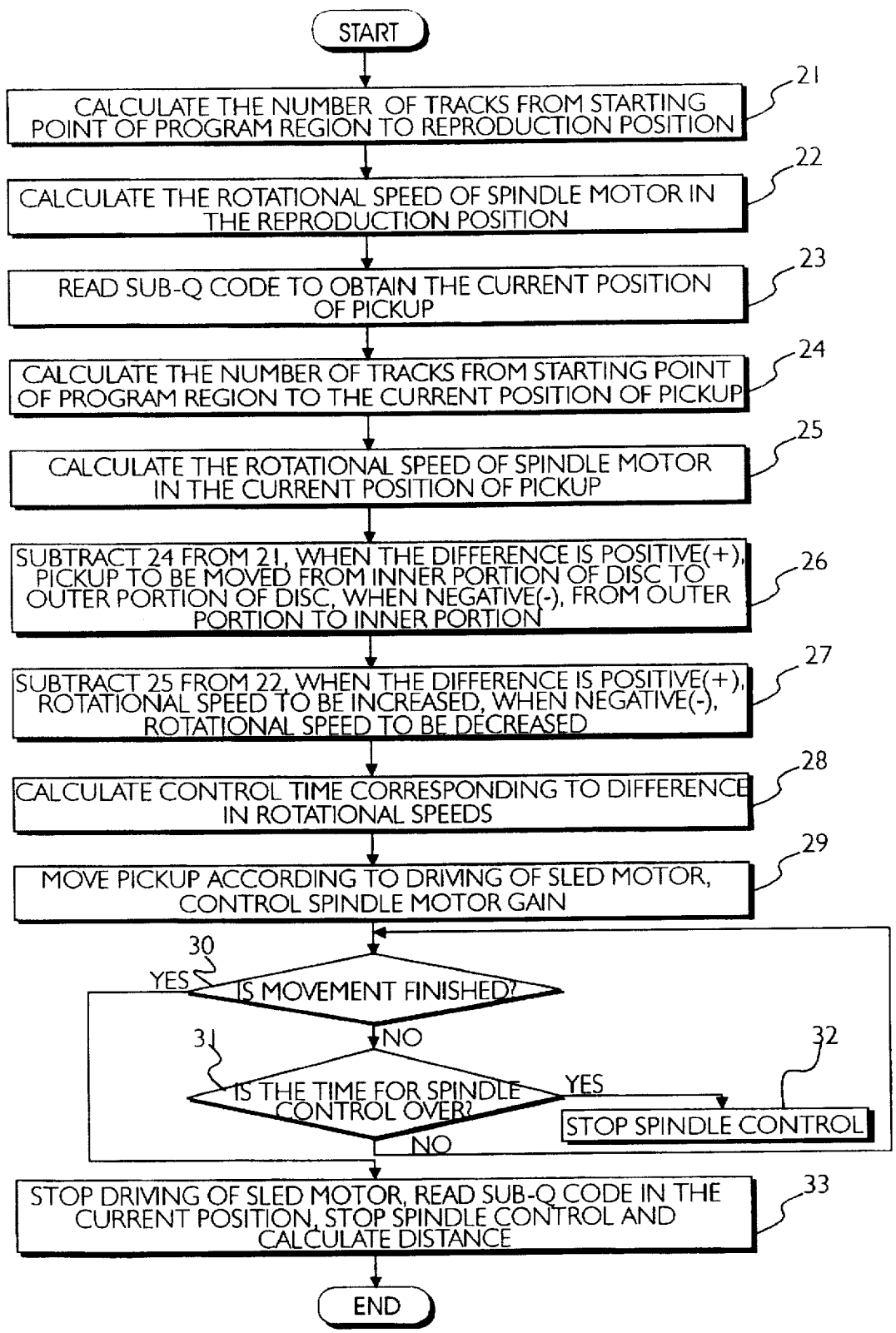
FIG. 2 is a flowchart showing the steps for controlling spindle motor gain in a CD-ROM drive according to the principles of the present invention.

The steps for controlling spindle motor gain in a CD-ROM drive according to the principles of the present invention will now be described with reference to FIGS. 1 and 2.

First, in response to information regarding a position of audio or computer data to be reproduced and an instruction from main controller 11 to reproduce the audio or computer data, the number of tracks from a starting point of the program region to a reproduction position is calculated with reference to the tables of ROM unit 15, in step 21. The rotational speed of spindle motor 16 at the reproduction position is then calculated with reference to the tables of ROM unit 15, in step 22. When the reproduction position corresponds to audio data, the rotational speed of spindle motor 16 corresponds to the normal speed, and when the reproduction position corresponds to computer data, the rotational speed of spindle motor 16 corresponds to a multiple speed. Then, in step 23, a sub-q code is read so as to obtain information regarding the current position of pickup 18. In step 24, the number of tracks from the starting point of the program region to the current position of the pickup 18 is calculated with reference to the tables of ROM unit 15. The rotational speed of spindle motor 16 at the current position of the pickup 18 is then calculated with reference to the tables of ROM unit 15, in step 25. When the current position of the pickup 18 corresponds to audio data, the rotational speed of spindle motor 16 corresponds to the normal speed, and when the current position of the pickup 18 corresponds to computer data, the rotational speed of spindle motor 16 corresponds to a multiple speed. In step 26, the number of tracks calculated in step 24 representing the distance between the starting point of the program region and the current position of the pickup 18, is subtracted from the number of tracks calculated in step 21 representing the distance between the starting point of the program region and the reproduction position. When the difference between these values is positive, the pickup 18 is to be moved from an inner portion of the disc to an outer portion of the disc. Similarly, when the difference between these values is negative, the pickup 18 is to be moved from an outer portion of the disc 17 to an inner portion of the disc 17. Note that these movements are based on an orientation wherein the starting point of the program region is located at an inner portion of the disc 17. Next, in step 27, the rotational speed of spindle motor 16 at the current position of the pickup 18 calculated in step 25, is subtracted from the rotational speed of the spindle motor 16 at the reproduction position calculated in step 22. When the difference between these rotational speeds is positive, the rotational speed of spindle motor 16 is to be increased. Similarly, when the difference between these rotational speeds is negative, the rotational speed of spindle motor 16 is to be decreased. That is, the amount by which the rotational speed of spindle motor 16 must be adjusted (i.e., converted) corresponds to the rotational speed obtained by subtracting the rotational speed of spindle motor 16 at the current position of the pickup 18 from the rotational speed of spindle motor 16 at the reproduction position. In step 28, main controller 11 determines an amount of time that the gain of the spindle motor 16 needs to be controlled from the amount by which the rotation speed of the spindle motor 16 must be adjusted. That is, the rotational speed difference obtained in step 27 is converted into control time. The control time is obtained with reference to the tables of ROM unit 15 and considers factors, including the torque and load of spindle motor 16.

In step 29, a sled motor 19 is driven to move the pickup 18 based on the previously obtained data, and the gain of the spindle motor is controlled. In step 30, a determination is made as to whether the movement of the pickup 18 is finished. If the movement of the pickup 18 is finished, driving of the sled motor 19 is stopped, the sub-q code at the current position of the pickup 18 is read, the spindle motor control is stopped, and the distance to be moved from the current position of the pickup 18 to a target position is calculated, in step 33. Here, if the distance to be moved corresponds to only one or two tracks, a trackjump is used to move the distance, whereas if the distance to be moved is equal to or greater than three tracks, the sled motor 19 is used.

Referring back to step 30, if the movement of the pickup 18 is not finished, a determination is made as to whether the time for controlling spindle motor 16 is over, in step 31.

When the time is over, control of spindle motor 16 is stopped, in step 32. However, when the time is not over, step 30 is repeatedly performed.

Figure 3:
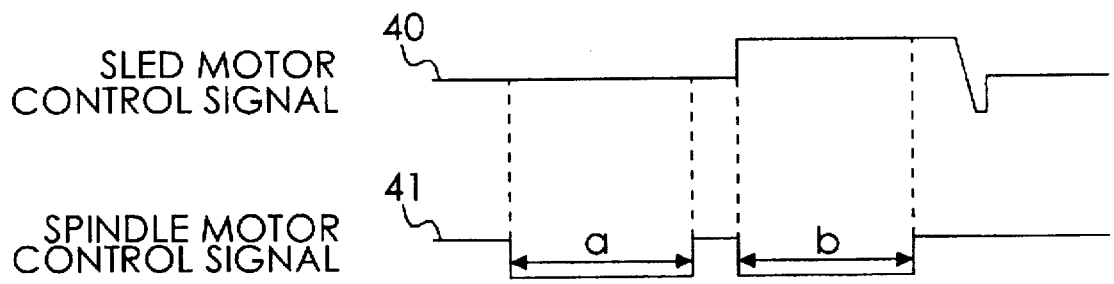
FIG. 3 is a waveform diagram showing control signals used in a conventional spindle motor gain control method in which the rotational speed of the spindle motor is first converted, and then a reproduction position is searched.
Figure 4:
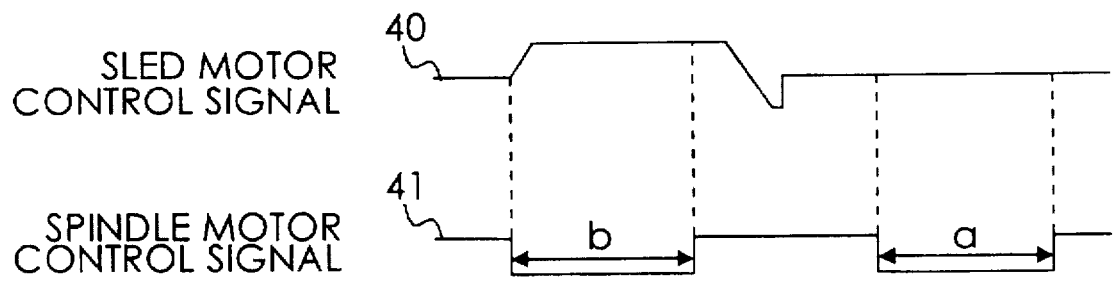
FIG. 4 is a waveform diagram showing control signals used in a conventional spindle motor gain control method in which a reproduction position is first searched, and then the rotational speed of the spindle motor is convened.
Figure 5:
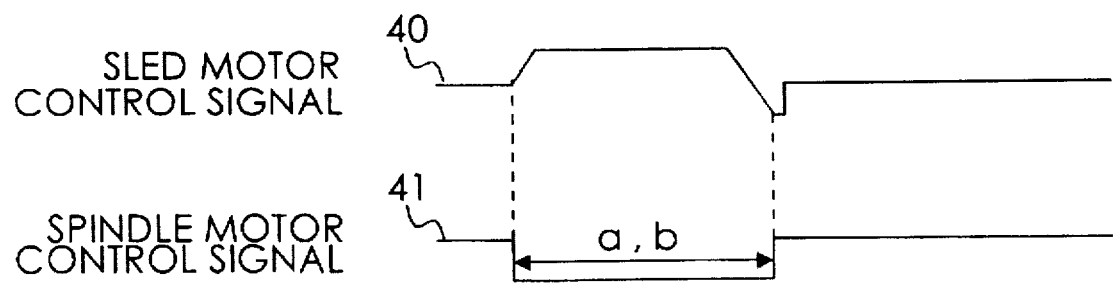
FIG. 5 is a waveform diagram showing control signals used in a spindle motor gain control method according to the principles of the present invention.

Referring now to the waveform diagrams of control signals shown in FIGS. 3 through 5, the advantages of the present invention will be further pointed out. In the waveform diagrams of a sled motor control signal 40 and a spindle motor control signal 41 shown in FIGS. 3 through 5, reference character "a" indicates an interval for controlling the gain of a spindle motor to convert between normal speed and multiple speed, or vice-versa, and reference character "b" indicates an interval for controlling the gain of a spindle motor to adjust the rotational speed of the spindle motor when the pickup moves from an inner portion of the disc to an outer portion of the disc, or vice-versa. FIGS. 3 and 4 represent conventional schemes of control signals, while FIG. 5 represents the control signal scheme according to the present invention. According to the waveform diagram shown in FIG. 3, the rotational speed of the spindle motor is first converted from normal speed to multiple speed, or vice-versa, and then the reproduction position of data to be reproduced is searched. According to the waveform diagram shown in FIG. 4, the reproduction position of data to be reproduced is first searched, and then the rotational speed of the spindle motor is converted from normal speed to multiple speed, or vice-versa. According to the waveform diagram shown in FIG. 5, however, the reproduction position of data to be reproduced is searched, and the rotational speed of the spindle motor is converted from normal speed to multiple speed, or vice-versa at the same time. Accordingly, the time period for controlling the spindle motor gain, and the time period required for accessing data are reduced.

As described above, in the spindle motor gain control method for the CD-ROM drive constructed according to the principles of the present invention, an amount by which the rotational speed of spindle motor 16 needs to be adjusted is calculated, and a time period for controlling the spindle motor gain is determined. As a result, the gain of spindle motor 16 is controlled for a duration equal to the time period, so that the amount of time required to convert the rotational speed of spindle motor 16 from a normal speed to a multiple speed, or from a multiple speed to a normal speed is sharply reduced. Therefore, performance of the CD-ROM drive is enhanced because the time for adjusting the rotational speed of the spindle motor can be greatly reduced when computer data is accessed while audio data is reproduced, and when computer data is reproduced while audio data is accessed, so that the performance of the CD-ROM drive is enhanced.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for controlling a spindle motor in a CD-ROM drive, comprising the steps of:

calculating a first number of tracks on a disc from a starting point of a program region to a reproduction position of data to be reproduced according to information received from a main controller;

calculating a first rotational speed of said spindle motor corresponding to said reproduction position;

reading a predetermined code to obtain information representative of a current position of a pickup;

calculating a second number of tracks on said disc from said starting point of said program region to said current position of said pickup;

calculating a second rotational speed of said spindle motor corresponding to said current position of said pickup; and driving a sled motor to move said pickup to said reproduction position based on a first quantity defining a difference between said first number of tracks and said second number of tracks, and controlling said spindle motor for a predetermined control time corresponding to a second quantity defining a difference between said first rotational speed and said second rotational speed, said predetermined control time being obtained from a memory storing said predetermined control time and said second quantity.

2. The method as claimed in claim 1, wherein said predetermined code comprises a sub-q code.

3. The method as claimed in claim 1, wherein said first rotational speed corresponds to a normal speed and said second rotational speed corresponds to a multiple speed.

4. The method as claimed in claim 1, wherein said first rotational speed corresponds to a multiple speed and said second rotational speed corresponds to a normal speed.

5. An apparatus for controlling a gain of a spindle motor in a CD-ROM drive, said apparatus comprising:

a main controller for controlling an overall operation of said apparatus;

a spindle motor gain controller for controlling the gain of said spindle motor according to spindle motor gain control signals received from said main controller, said spindle motor gain control signals indicating a conversion of rotational speed of said spindle motor and a change of reproduction position on a disc;

a spindle motor driver for receiving said spindle motor gain signals, and generating spindle motor driving signals to drive said spindle motor;

a spindle motor controller for receiving error signals generated from said spindle motor, and comparing said error signals with a reference rotational speed of said spindle motor to generate spindle motor control signals for output to said spindle motor gain controller; and a memory for storing a first table providing audio data position information corresponding to a number of tracks in a program region on said disc, a second table providing rotational speeds of said spindle motor, and a third table providing predetermined time periods for controlling said spindle motor, said predetermined time periods corresponding to differences in said rotational speeds.

6. The apparatus as claimed in claim 5, wherein said memory comprises a read-only memory.

7. The apparatus as claimed in claim 5, further comprised of said spindle motor gain control signals for indicating the conversion of the rotational speed of said spindle motor from a normal speed to a multiple speed.

8. The apparatus as claimed in claim 5, further comprised of said spindle motor gain control signals for indicating the conversion of the rotational speed of said spindle motor from a multiple speed to a normal speed.

9. A method for controlling a spindle motor in a CD-ROM drive, comprising the steps of:

calculating a first number of tracks on a disc from a starting point of a program region to a reproduction position of data to be reproduced;

calculating a first rotational speed of said spindle motor corresponding to said reproduction position;

reading a predetermined code to obtain information representative of a current position of a pickup;

calculating a second number of tracks on said disc from said starting point of said program region to said current position of said pickup;

calculating a second rotational speed of said spindle motor corresponding to said current position of said pickup;

subtracting said second number of tracks from said first number of tracks to generate a first quantity;

subtracting said second rotational speed from said first rotational speed to generate a second quantity;

obtaining a control time based on said second quantity; and controlling said spindle motor for a time period corresponding to said control time.

10. The method as claimed in claim 9, wherein said predetermined code comprises a sub-q code.

11. The method as claimed in claim 9, wherein said first rotational speed corresponds to a normal speed and said second rotational speed corresponds to a multiple speed.

12. The method as claimed in claim 9, wherein said first rotational speed corresponds to a multiple speed and said second rotational speed corresponds to a normal speed.

13. The method as claimed in claim 9, wherein said control time is obtained through a look-up table stored in a read-only memory unit of said CD-ROM drive.

14. The method as claimed in claim 9, wherein said step of controlling said spindle motor comprises increasing a current rotational speed of said spindle motor when said second quantity exhibits a positive value.

15. The method as claimed in claim 9, wherein said step of controlling said spindle motor comprises decreasing a current rotational speed of said spindle motor when said second quantity exhibits a negative value.

16. A method for controlling a spindle motor in a disc drive device, comprising the steps of:

calculating a first number of tracks on a disc from a starting point of a program region to a reproduction position of data to be reproduced;

calculating a first rotational speed of said spindle motor corresponding to said reproduction position;

calculating a second number of tracks on said disc from said starting point of said program region to a current position of a pickup;

calculating a second rotational speed of said spindle motor corresponding to said current position of said pickup;

subtracting said second number of tracks from said first number of tracks to generate a first quantity;

subtracting said second rotational speed from said first rotational speed to generate a second quantity;

accessing said second quantity in a read-only memory to obtain a predetermined control time corresponding to said second quantity; and controlling said spindle motor for a time period corresponding to said predetermined control time.

17. The method as claimed in claim 16, wherein said step of controlling said spindle motor comprises increasing a current rotational speed of said spindle motor when said second quantity exhibits a positive value.

18. The method as claimed in claim 16, wherein said step of controlling said spindle motor comprises decreasing a current rotational speed of said spindle motor when said second quantity exhibits a negative value.

19. The method as claimed in claim 16, wherein said predetermined control time depends upon a torque and a load of said spindle motor.

\* \* \* \* \*